United States Patent [19]

Shono

[11] 4,196,992
[45] Apr. 8, 1980

[54] CAMERA FILM WINDING AND SHUTTER RELEASE MECHANISM

[75] Inventor: Tetsuji Shono, Kawagoe, Japan

[73] Assignee: Asahi Kogaku Kogyo Kabushiki Kaisha, Tokyo, Japan

[21] Appl. No.: 939,604

[22] Filed: Sep. 5, 1978

[30] Foreign Application Priority Data

Sep. 12, 1977 [JP] Japan ............................ 52-122708[U]

[51] Int. Cl.² .............................................. G03B 1/18
[52] U.S. Cl. .................................................. 354/173
[58] Field of Search ............... 354/173, 171, 204, 212, 354/266

[56] References Cited

U.S. PATENT DOCUMENTS 3,946,409  3/1976  Toyoda .................................. 354/173
4,042,942  8/1977  Haraguchi ............................. 354/171

Primary Examiner—Michael L. Gellner
Attorney, Agent, or Firm—Sughrue, Rothwell, Mion, Zinn and Macpeak

[57] ABSTRACT

A motorized system for a camera using a common motor for film winding and shutter release wherein the shutter release operation is performed for a first direction of rotation of the motor and the film winding operation performed for the second or opposite direction of rotation. A mechanism including a ratchet and pawl arrangement is provided for returning the actuating mechanism to its rest position during the winding operation. Depression of the shutter button causes a control signal to be transmitted effecting motor operation in the first direction which releases the shutter through the actuating mechanism. Once the shutter release has been completed, a locking lever is released which simultaneously actuates a switch causing the motor to reverse direction and releasing a locking ring which is coupled to the winding shaft of the camera. The winding operation continues until the locking lever falls back into position with the locking ring at which time power is removed from the motor. Depression of the shutter button repeats the process.

9 Claims, 5 Drawing Figures

CAMERA FILM WINDING AND SHUTTER RELEASE MECHANISM

BACKGROUND OF THE INVENTION

A motor drive mechanism is detachably mounted on a camera, or it is incorporated in the camera body to carry out an automatic winding operation of film in the camera. The release operation of the camera shutter is generally carried out in accordance with the following three methods in cameras using motorized winding mechanisms:

(a) The locking is purely mechanically released by the force of depressing the release button, thereby to effect the release operation;

(b) The motor is used for the winding operation only. The release operation is effectuated by an exciting magnet or solenoid which is operated upon energization;

(c) The winding and release operations are carried out by one motor. By utilizing the effect of increased resistance to winding abruptly before the completion of the operation, the motor is disconnected from the winding mechanism, connected to the release mechanism, and the release operation is carried out by the force of the motor.

In the first method, the motor drive mechanism can be considerably simplified, because in principle the winding operation is effectuated through a reduction gear mechanism (such as a gear train) by the output shaft of the motor and the operation of the motor. The motor is controlled by a switch which is operated in association with a member which turns through a predetermined angle during one winding operation in the camera. In this method, the force of the motor is not needed for the release operation. However, in the first method, the release operation cannot be electrically carried out, and therefore this method is not suitable for continuous or remote photographing. Rather it is suitable for low-grade cameras which can be manufactured at relatively low cost.

In the second method, as in the first, the motor is used for the winding operation only, and an exciting magnetic or solenoid latch is used for the release operation. The relationship between the winding operation and the release operation can be electrically isolated, for instance, in such a manner that the release operation will not be carried out during the winding operation. Therefore, the construction of the motor drive mechanism according to the second method can be simplified. Unlike the first method in the second the release operation can be effected electrically, and therefore realization of high-grade motor drive operations such as continuous and remote photographing can be attained. The disadvantages are although a type of rotating solenoid in the form of an electric motor is incorporated and the rotation of the motor can be utilized for the release operation, since the winding operation is completed before the release operation, it is necessary to provide an additional solenoid for the release operation. This contributes to an increase in manufacturing cost. Also, since an exciting magnet or solenoid which is, in principle, unsuitable for providing strong force over a long stroke is employed for releasing the locking mechanism, it is necessary to form a locking section which can release the locking mechanism with a force and a stroke which are less than those in the case of the conventional locking section. Therefore, the motor drive mechanism according to the second method is affected by shock and by components interposed between the solenoid or the like and the locking section. Accordingly, it is absolutely necessary to incorporate the additional solenoid in the camera. This limitation inhibits the degree of freedom of the camera designer in configuring the construction of the product.

The third method is the orthodox technique for a motor drive mechanism. As is well known in the art, many types of motor drive mechanisms have been proposed in accordance with this method. Since the release operation can be effected electrically, a highgrade motor drive operation can be realized similarly as in the first method. In this technique, the output of the motor rotation in one direction is switched upon completion of the winding operation so that it is used for the release operation instead of the winding operation. The variation of the force necessary for winding is used as a switching signal, and the clutch is switched with the aid of the force of the motor. Therefore, the third method is disadvantageous in that the clutch section is rather intricate and the switching mechanism is also complicated. The fundamental object of the third method is to operate a camera which has a traditional mechanism without a motor drive system, with an added motor drive module. Since the release operation is effected by the motor, a releasing force greater than that in the motor drive mechanism according to the third method is configured in such a manner that it can be detachably mounted on a camera.

SUMMARY OF INVENTION

In the present invention, the advantage of the first two methods in that the output of the motor is transmitted through its output shaft and the reduction gear for the film winding operation only (therefore, the switching clutch is unnecessary) together with the merit of the third method using the motive power from the motor only, and the winding and shutter release operations are effectuated by the motor, are employed. These techniques are compatably employed. Hence, in this invention, a release mechanism is operated only when the direction of motor rotation becomes opposite to that in the winding operation is provided, so that the release operation occurs by reverse rotation of the motor after the completion of the winding operation.

Hence it is an object of this invention to provide for a more reliable winding and shutter release mechanism in a camera.

It is another object of this invention to define a motorized camera system using motor output without switching or clutch mechanisms.

Yet another object of this invention to define a motorized camera system low in cost yet reliable and offering versatility of design.

This invention will be described with reference to the accompanying drawings and the description of the Preferred Embodiment that follow.

DESCRIPTION OF THE PREFERRED EMBODIMENT

Figure 1:
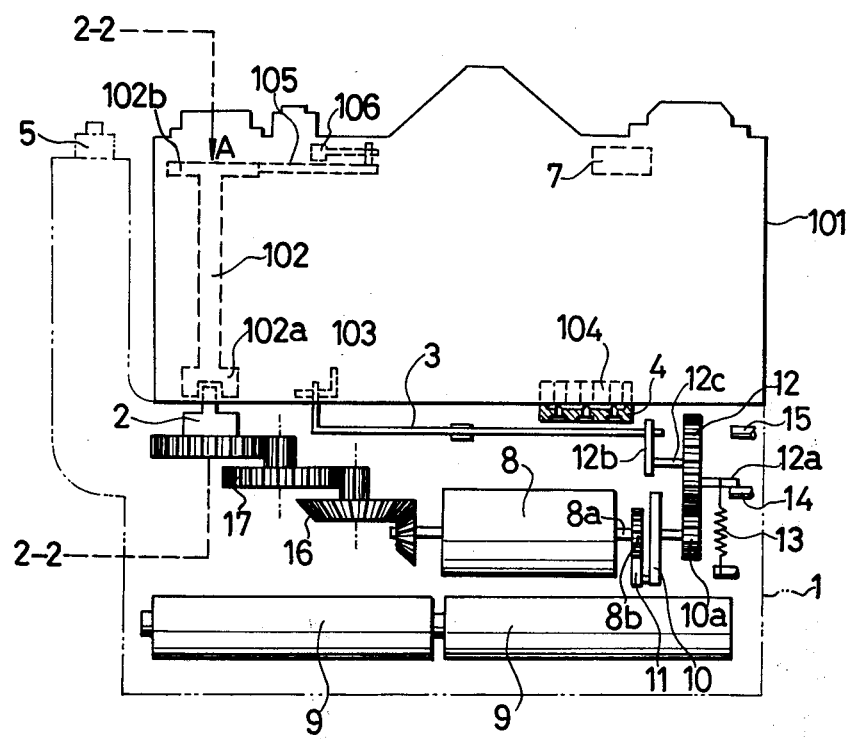
FIG. 1 is a front view showing a detachably mounted motor drive unit mounted on a camera.

Referring now to FIG. 1 a front view showing a motor drive unit 1 mounted on a camera 101 is shown. The motor drive unit can be detachably mounted on the camera. More specifically, the drive unit can be fixedly mounted on the camera by screwing a tightening screw (not shown) of the motor drive unit 1 into a tripod taphole (not shown) on the bottom of the camera 101. In this operation, a joint 102a integral with a winding shaft 102 of the camera is connected to a winding joint 2 of the motor drive unit 1. A release plate 103 of the camera 101 is connected to a release lever 3 of the motor drive unit 1, and an electrical connector 104 of the camera 101 is connected to a corresponding connector 4 of the motor drive unit 1.

Figure 2:
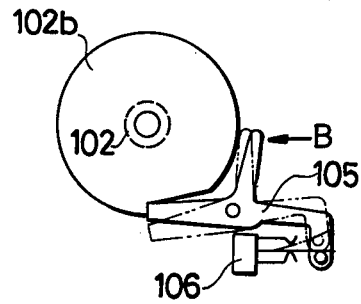
FIG. 2 is a partial section of FIG. 1 as viewed in the direction of the arrow A in FIG. 1 along section line 2—2.
Figure 3:
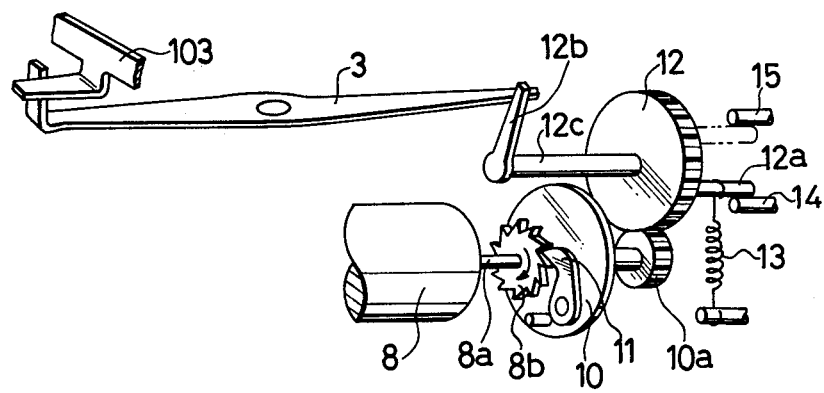
FIG. 3 is a perspective view for a description of a release mechanism according to this invention.
Figure 4:
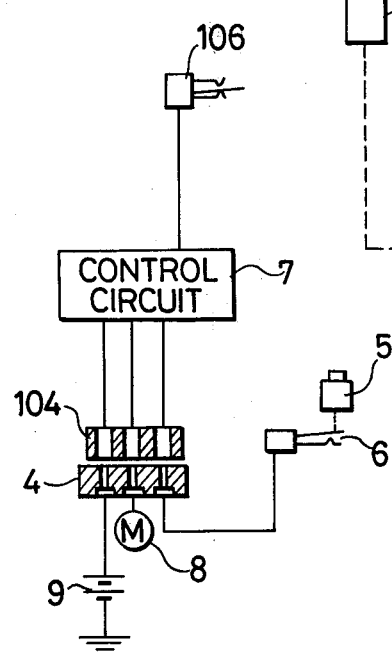
FIG. 4 is a schematic diagram for a description of an electrical circuit employed in this invention.

Referring to FIGS. 1 through 4, the operations of various section in the camera and the motor drive unit will be described. When a shutter release button 5 (FIG. 1) provided on the motor drive unit 1 is depressed, a release switch 6 (FIG. 4) is operated to transmit a release signal to a control circuit 7 (FIG. 4). As a result, the control circuit 7 is actuated to cause a battery 9 to supply current pulse to an electric motor 8. Therefore, the output shaft 8a of the motor 8 is rotated clockwise as indicated in FIG. 3, and accordingly a ratchet wheel 8b integral with the output shaft 8a is rotated clockwise. A ratchet pawl holder 10 is rotatably supported coaxially with the output shaft 8a, and has a ratchet pawl 11. The ratchet pawl 11 is biased to turn counterclockwise by means of a spring. Therefore, if the ratchet wheel 8b is turned clockwise, then the ratchet pawl 11 is engaged therewith, as a result of which the ratchet pawl holder 10 is also turned clockwise.

A gear 10a provided at one end of the ratchet pawl holder 10 engages a release gear 12 which tends to turn clockwise by means of a restoring spring 13 connected to a pin 12a axially displaced and embedded in the release gear. Therefore, the release gear 12 which is stopped at a position shown in FIG. 3 initially will turn counterclockwise against the elastic force of the restoring spring 13. When the pin 12a reaches a position indicated by the dotted line in FIG. 3 where it abuts against a stopper pin 15, the current supply to the motor 8 is terminated but it still rotates by its inertia. Therefore, even if the pin 12a abuts against the stopper pin 15 and the energization of the motor 8 is suspended, no appreciable shock will be imparted to the shutter release mechanism.

As shown in FIG. 3, when the release gear 12 is turned counterclockwise, a rod 12b integral with the release gear output shaft 12c is also turned counterclockwise, as a result of which the release lever 3 is turned counterclockwise to push the release plate 103 of the camera 101 backward. Therefore, locking of the camera is released, and shutter release is accomplished. When the operation of the shutter (not shown) terminates, a force in the direction of the arrow A in FIG. 1 is exerted by a shutter bottom curtain (not shown) on one end of a locking lever which has locked a locking ring cam element 102b integral with the winding shaft 102 as shown in FIG. 2. Hence the locking lever 105 will turn counterclockwise to a position indicated by the dotted line shown in FIG. 2. In this operation, the locking ring cam element 102b is disengaged from the locking lever 105 and simultaneously the locking lever 105 operates an operation control change-over switch 106. As a result, a winding start signal will be applied to the control circuit 7, which energizes the motor 8 in the polarity opposite to that in the case of the shutter release operation. Therefore, the motor 8 will rotate in a counterclockwise direction as viewed in FIG. 3. The release mechanism is restored by means of the restoring spring 13, and the ratchet pawl holder 10 and the release gear 12 are stopped at the positions indicated by the solid lines in FIG. 3. Therefore, when the ratchet wheel 8b is turned counterclockwise, the ratchet pawl 11 cannot lock the ratchet wheel 8b, and accordingly the shutter release mechanism will not operate. The motor 8 is rotated counterclockwise, and as shown in FIG. 1 the rotation of the motor 8 is transmitted to the winding joint 2 through a train of reduction gears 16 and 17 to turn the winding joint 2 counterclockwise as viewed in the direction of the arrow A.

As a result, the winding shaft 102 is also turned counterclockwise, so that the film and the shutter of the camera 101 are wound. As the winding shaft 102 turns counterclockwise, the locking ring 102b is also turned counterclockwise. As a result, the force (indicated by the arrow B in FIG. 2) of the shutter bottom curtain (not shown) is no longer used to charge the shutter, and the locking lever 105 tends to turn clockwise with the aid of the contact of the operation control change-over switch 106. However, the periphery of the locking ring 102b prevents the locking lever 105 from turning clockwise. Accordingly, during the winding operation, the locking lever 105 is held at the position indicated by the dotted line in FIG. 2. When the winding is advanced further so that the locking ring 102b makes approximately one revolution, the locking lever 105 will drop into the locking recess formed in the periphery of the locking ring cam element 102b.

Therefore, the locking lever 105 starts turning clockwise, and the winding operation is now completed. Immediately before the locking lever 105 locks into the locking ring 102b, the operation control change-over switch 106 is effectuated. The control circuit 7 (FIG. 4) operates to suspend the energization of the motor 8 and simultaneously to short two input terminals (not shown) of the motor 8, thereby to abruptly decrease the speed of the motor 8. The motor 8 is accordingly stopped when the locking lever 105 locks the locking ring 102b.

Figure 5:
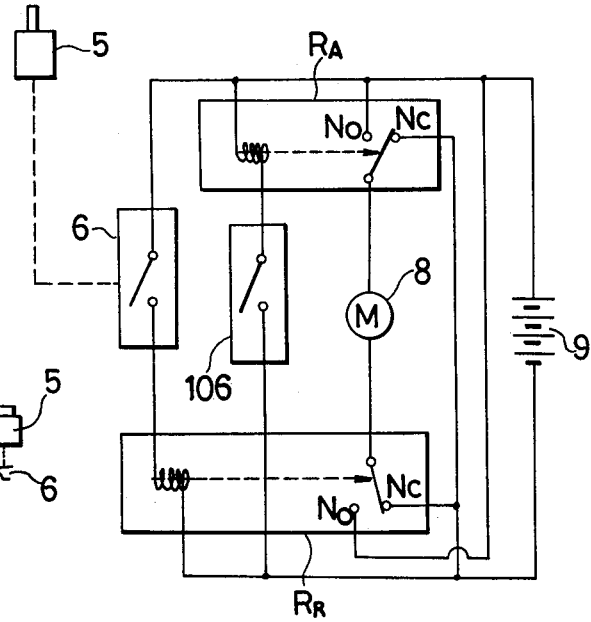
FIG. 5 is a circuit diagram of the control circuit of FIG. 4.

Referring now to FIG. 5, the circuit diagram for the control circuit 7 is shown. When the shutter button 5 is depressed, the switch 6 is closed to thereby energize the coil in the relay $R_R$. This actuation is in response to the release signal as transmitted by the switch 6. When the coil $R_R$ is energized, the relay will shift from a normally closed position (Nc) to an open position (No). As a result, the motor 8 will be reversed in rotation derection to carry out the release operation.

When the release operation is complete, the switch 106 is closed, as described herein to energize the coil or relay $R_A$. The relay $R_R$ will shift from its closed position (Nc) to an open position (No) and the motor will be rotated to carry out the winding operation. After completing the winding operation switch 106 will be opened. This causes relay $R_A$ to shift from its normally open position to the closed position. The motor will then be stopped. It is apparent then that when the switches 6 or 106 are open the two output terminals of the motor 8 will be shorted to abruptly decrease motor speed. Also, with only switch 6 closed the winding operation cannot be effectuated.

During the shutter release operation described above, the motor 8 is rotated in the direction opposite to that in the winding operation, and therefore the winding mechanism comprising gear trains must be capable of reversible rotation. Since the winding shaft 102 of the camera 101 is rotated only in the counterclockwise direction as viewed in FIG. 2, the winding joint 2 cannot turn clockwise in the shutter release operation. However, this problem can be solved by the use of a backlash mechanism between coupling 102a and the winding coupling 2 and also between the reduction gears 16, 17. This mechanism will work acceptably even if the rotation of the motor 8 is not as great as in the release operation. If it is assumed that when the winding is completed, the locking ring 102b is stopped while forcibly depressing the locking lever 105 (FIG. 2) and is maintained unchanged even in the release operation, then the locking lever 105 will not operate even if the force of the shutter bottom curtain is applied thereto. This drawback can be eliminated by the reverse rotation. If it is possible to drive the motor 8 with for example a DC 6 V power supply to provide current of 2 A for the current supply pulse in the release operation, then the motor 8 can provide a torque of the order of 100 g/cm since it is a DC motor. If the gear ratio of the gear 10a and the release gear 12 in FIG. 1. is 3:1, the torque of 300 g/cm is exerted on a release gear 12. And if the distance between the shaft of the release gear and the point of the rod 12b where the latter 12b abuts against the release lever 3 is one (1) cm, then a force of 300 g is imparted to the release lever 3. If, the motor 8 generates an output force and stroke to depress the release plate 103 to effect the release operation, the motor 8 rotates in the aforementioned backlash of the winding mechanism, then joint 102a will never be reversably turned. In the situation where a large amount of force is required for the shutter release operation, the problem can be solved by providing the mechanism of the ratchet wheel 8a, rachet pawl 11 and ratchet pawl holder 10 shown in FIG. 3 in the reduction gear train of the winding mechanism in such a manner that these elements engage one another only when the winding is carried out. The ratchet mechanism provided for the shutter release mechanism (or the winding mechanism when required) is used for driving as well as detecting whether or not the motor 8 is rotating to operate the shutter release mechanism.

Therefore, it is apparent that the arrangement of the ratchet mechanism may be replaced by other types of mechanisms if they satisfy the requirements described above. The motor drive mechanism according to the invention has been described with reference to the example where it can be detachably mounted on the camera; however, it is apparent that the above-described arrangement of the motor drive mechanism can be similarly applied to the case where it is incorporated on a permanent basis in a camera body.

As is apparent from the above description, in the motor drive mechanism according to this invention, the shutter release mechanism operates only when the rotation direction of the motor becomes opposite to that in the winding operation is provided, and the release operation is effected by reversely rotating the motor after the completion of the winding operation. Therefore, the motor drive mechanism according to the invention has the following important advantages over prior systems.

The arrangement is not radically different from that in the first method described herein, and no releasing solenoid is required. Since the release operation is effected by the motor, a strong releasing force can be readily obtained.

When compared with the third method described herein where the winding and release operations are carried out by the same motor, the motor's output for the winding operation can be simply and positively switched over to that for the shutter release operation, and no switching clutch is necessary. Finally, since the release signal is electrically applied, it can be utilized in conjunction with high-grade motor drive functions such as continuous operation and remote photographing.

Thus, a motor drive mechanism having simple construction, low cost and high-grade function can be accomplished according to this invention.

I claim:

1. In a camera system having a single versible drive motor including means for actuating the shutter release mechanism for a first direction of rotation of said motor and means for performing a film winding operation in a second direction of rotation of said motor and further including means for reversing the direction of rotation of said motor when the operation of said shutter release mechanism has been completed, the improvement comprising: means for returning said means for actuating said shutter release mechanism from an active actuating position to a rest position while said motor is operated in said second direction of rotation.

2. The camera system of claim 1 wherein said actuating means comprises a release gear rotating when said motor operates in said first direction, a shaft coupled to and rotating with said release gear, a rod extending laterally from said shaft, and a release lever, said release lever being rotatable from a rest position to an active actuating position by said rod.

3. The camera system of claim 2 further comprising first and second stop means for limiting the range of movement of said pin.

4. The camera system of claim 1 wherein said returning means comprises a ratchet wheel positioned on a shaft of said motor, a pawl holder, a pawl arm mounted upon said pawl holder, said pawl being positioned so that said pawl holder rotates when said motor rotates in said first direction and said pawl holder is released from being driven by said motor when said motor is in said second direction, a pin extending from said release gear at a position removed from the central axis thereof, and a spring coupled to said pin for urging said release gear towards a rest position.

5. The camera system of claim 1 further comprising a drive gear solidly coupled to said pawl holder and operatively engaged with said release gear.

6. The camera of claim 1 further comprising a winding shaft in said camera for winding film, cam means disposed on one end of said winding shaft and a locking lever responsive to said cam movement.

7. The camera of claim 6 further comprising switch means operative by said locking lever and said means to reverse the direction of said motor comprises a control circuit responsive to said switch means.

8. The camera of claim 7 wherein said locking lever moves in one direction in response to actuation of said shutter mechanism, whereby movement of said locking lever in said one direction actuates said switch means to rotate said motor in said second direction.

9. The camera of claim 7 wherein said control circuit comprises relay means responsive to said switch means to selectively reverse the direction of said motor or stop rotation thereof, said relay means comprising first and second relays, said first relay normally open to effectuate rotation of said motor in said reverse direction and said second relay normally open to effectuate rotation of said motor in said first direction.

* * * * *